United States Patent
Inoue et al.

(10) Patent No.: US 9,261,633 B2
(45) Date of Patent: Feb. 16, 2016

(54) BLACK RESIN COMPOSITION, RESIN BLACK MATRIX SUBSTRATE, AND TOUCH PANEL

(75) Inventors: Yoshihiko Inoue, Shiga (JP); Ryosuke Aihara, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/007,641

(22) PCT Filed: Mar. 23, 2012

(86) PCT No.: PCT/JP2012/057452
§ 371 (c)(1),
(2), (4) Date: Sep. 25, 2013

(87) PCT Pub. No.: WO2012/133148
PCT Pub. Date: Oct. 4, 2012

(65) Prior Publication Data
US 2014/0011125 A1    Jan. 9, 2014

(30) Foreign Application Priority Data

Mar. 25, 2011 (JP) ................................. 2011-067355

(51) Int. Cl.
*F21V 9/00* (2015.01)
*G02B 5/20* (2006.01)
*C08K 3/28* (2006.01)
*C08K 9/02* (2006.01)
*C09D 11/037* (2014.01)
*C09D 11/324* (2014.01)
*C09D 133/10* (2006.01)
*G06F 3/041* (2006.01)
*C09D 4/06* (2006.01)
*C08F 8/14* (2006.01)
*G02F 1/1333* (2006.01)
*G02F 1/1335* (2006.01)
*C08F 222/10* (2006.01)
*C08F 265/06* (2006.01)

(52) U.S. Cl.
CPC ... *G02B 5/20* (2013.01); *C08F 8/14* (2013.01); *C08K 3/28* (2013.01); *C08K 9/02* (2013.01); *C09D 4/06* (2013.01); *C09D 11/037* (2013.01); *C09D 11/324* (2013.01); *C09D 133/10* (2013.01); *G06F 3/041* (2013.01); *C08F 222/1006* (2013.01); *C08F 265/06* (2013.01); *G02B 5/201* (2013.01); *G02F 1/13338* (2013.01); *G02F 1/133512* (2013.01); *G06F 2203/04103* (2013.01)

(58) Field of Classification Search
CPC ............... G02B 1/04; G02B 5/22; C08K 5/00
USPC ........................ 252/586, 582; 428/694; 430/7
See application file for complete search history.

(56) References Cited

U.S. PATENT DOCUMENTS

2010/0038606 A1* 2/2010 Inoue et al. ................... 252/586

FOREIGN PATENT DOCUMENTS

| JP | 05186704 | * | 7/1993 |
| JP | 2000-056126 | A | 2/2000 |
| JP | 2002-020673 | A | 1/2002 |
| JP | 2008-249987 | A | 10/2008 |

OTHER PUBLICATIONS

International Search Report—PCT/JP2012/057452—issued Jun. 5, 2012.

* cited by examiner

*Primary Examiner* — Monique Peets
(74) *Attorney, Agent, or Firm* — Pillsbury Winthrop Shaw Pittman LLP

(57) ABSTRACT

Disclosed is a black resin composition with which a black matrix having high insulation properties even after heat treatment at a high temperature and, in addition, achromatic reflection properties can be readily formed. The black resin composition comprises (A) a light-shielding material, (B) an alkali-soluble resin, and (C) an organic solvent, and comprises (A-1) a carbon black and (A-2) titanium nitride compound particles as the light-shielding material (A). The carbon black (A-1) is surface-treated with a sulfur-containing compound, and in the surface composition, the percentage of carbon atoms is 95% or less and the percentage of sulfur atoms is 0.5% or more.

16 Claims, No Drawings

BLACK RESIN COMPOSITION, RESIN BLACK MATRIX SUBSTRATE, AND TOUCH PANEL

CROSS REFERENCE TO RELATED APPLICATIONS

This application is a national stage entry of International Application No. PCT/JP2012/057452 filed on Mar. 23, 2012 which claims priority to Japanese Patent Application No. 2011-067355 filed on Mar. 25, 2011, the entire contents of which are herein incorporated by reference.

TECHNICAL FIELD

The present invention relates to a black resin composition, a resin black matrix formed using the same, and a resin black matrix substrate using the same.

BACKGROUND ART

Color filters are generally produced by a method in which, on the surface of a transparent substrate in which a black matrix is formed such as glass or a plastic sheet, different hues of red, green, and blue are sequentially formed in a color pattern such as stripes or mosaic. The black matrix used as a light-shielding film serves to prevent the decrease in contrast and color purity due to light leakage between pixels.

Also in a substrate for a touch panel, a black matrix is formed likewise as a light-shielding film, and since the black matrix is directly viewed through glass, the reflected hue is required to be achromatic. Further, depending on the constitution, it is necessary to form electrodes and the like after forming a black matrix, and, accordingly, high adhesion and chemical resistance as well as high insulation properties are required.

Conventionally, films on which a metal such as chromium, nickel, or aluminum or a metal compound is deposited have been used as a black matrix, but they have problems in that, for example, the process is complicated and costly, and the surface of the metallized thin film is highly reflective. Thus, as a method that can solve these problems, the pigment dispersion method which uses a resin composition in which pigments are dispersed is currently predominant.

In the pigment dispersion method, among negative and positive photosensitive compositions, negative photosensitive compositions mainly composed of acryl polymer, acrylic polyfunctional monomer or oligomer, photoinitiators, solvents, and pigments have been widely used. As a light-shielding material, carbon black, titanium black such as low-valent titanium oxide and titanium nitride oxide, metal oxides such as iron oxide, and, in addition, mixtures of organic pigments have been used, and carbon black and titanium nitride oxide are predominant. To obtain a black matrix having high insulation properties, surface-treated carbon black and titanium black, or those mixed with organic pigments have been used as a light-shielding material.

As a technique for providing a carbon black with high insulation properties by surface treatment, oxidizing the surface of the carbon black, for example, with $O_3$ (Patent Document 1), resin coating by graft treatment (Patent Document 2), and modifying the surface of the carbon black with an organic group that does not comprise a polymer, such as a carboxylic acid group and a sulfonic acid group, (Patent Document 3, Patent Document 4, and Patent Document 5) are known, but there has been a problem in that when a resin black matrix is heat-treated at a high temperature, e.g., 250° C., the resistance decreases.

When titanium nitride oxide or a titanium nitride compound is used as a light-shielding material in a photosensitive resin material, a resin black matrix having a sufficiently high resistance value can be readily formed, and the resistance value will not decrease even when the resin black matrix is heat-treated at a high temperature. However, the resin black matrix obtained using titanium nitride oxide or a titanium nitride compound has a problem in that the transmitted light is colored blue and the reflected light is colored red. Patent Document 6 describes adding carbon black to titanium nitride oxide, but there have been problems in that when toning is performed by adding carbon black to titanium nitride oxide, the OD value decreases, and, in addition, a sufficient resistance value cannot be obtained. A resin black matrix having high resistance and relatively achromatic color properties can be obtained by using a titanium nitride compound with a small particle size as a light-shielding material (Patent Document 7), but for touch panel application and the like which strictly require reflected light chromaticity, a more achromatic color has been necessary.

Further, when a material mixed with organic pigments is used as a light-shielding material (Patent Document 8), a black matrix having high insulation properties can be obtained, but there has been a problem in that because of a low light-shielding effect per unit film thickness, the film thickness needs to be thick in order to produce a desired light-shielding effect, which deteriorates the flatness of the boundary with openings of the black matrix.

PRIOR ART DOCUMENTS

Patent Documents

Patent Document 1: JP 11-181326 A
Patent Document 2: JP 2002-249678 A
Patent Document 3: JP 3692601 B
Patent Document 4: JP 4464081 B
Patent Document 5: WO 2006/044676
Patent Document 6: JP 2008-260927 A
Patent Document 7: JP 2009-58946 A
Patent Document 8: JP 2009-75446 A

SUMMARY OF THE INVENTION

Problems to be Solved by the Invention

In view of the above-described drawbacks of the prior art, an object of the present invention is to provide a black resin composition with which a black matrix having high insulation properties even after heat treatment at a high temperature and further having achromatic reflection properties can be readily formed. Through the use of such a black resin composition, a resin black matrix having excellent heat resistance and good visibility can be obtained.

Means for Solving the Problems

To solve the problems of the prior art, the present inventors have intensively studied to discover that the problem to be solved by the present invention can be solved by using, as a light-shielding material, a mixture of a particular carbon black and titanium nitride compound particles as described below.

Thus, the object of the present invention is achieved by the following constitution.

(1) A black resin composition comprising (A) a light-shielding material, (B) an alkali-soluble resin, and (C) an organic solvent, the composition comprising (A-1) a carbon black and (A-2) titanium nitride compound particles as the light-shielding material (A), wherein the carbon black (A-1) is surface-treated with a sulfur-containing compound, and in the surface composition, the percentage of carbon atoms is 95% or less and the percentage of sulfur atoms is 0.5% or more.

(2) The black resin composition according to (1), wherein in sulfur components in the surface composition of the carbon black (A-1), the percentage of components derived from SOx (wherein x is a number from 2 to 4) and/or SO is 70% or more.

(3) The black resin composition according to (1) or (2), wherein when CuKα radiation is used as an X-ray source, the angle of diffraction 2θ of the peak derived from (200) plane of the titanium nitride compound particles (A-2) is 42.5° to 43.2°, and the crystallite size determined from the half bandwidth of the peak derived from (200) plane is 10 nm to 50 nm.

(4) The black resin composition according to any one of (1) to (3), wherein the titanium nitride compound particles (A-2) are produced by thermal plasma method.

(5) The black resin composition according to any one of (1) to (4), wherein the weight percentage of the titanium nitride compound particles (A-2) based on the total weight of the light-shielding material (A) is 20% by weight to 55% by weight.

(6) The black resin composition according to any one of (1) to (5), comprising a polymeric dispersant, wherein the polymeric dispersant has at least a tertiary amino group as a pigment-adsorbing group.

(7) The black resin composition according to any one of (1) to (6), which is used for a touch panel.

(8) A resin black matrix substrate in which a resin black matrix is formed, the resin black matrix substrate being obtained by applying the black resin composition according to any one of (1) to (7) onto a transparent substrate and forming a pattern.

(9) A touch panel comprising the resin black matrix substrate according to (8).

(10) A method of forming a resin black matrix, comprising applying the black resin composition according to any one of (1) to (7) onto a transparent substrate and forming a pattern.

Effects of the Invention

Through the use of the black resin composition of the present invention, a resin black matrix having high insulation properties and achromatic reflection properties can be easily obtained; further, a resin black matrix that does not cause reduction in insulation properties due to thermal history can be obtained; and a black matrix substrate with excellent reliability can be obtained.

BEST MODE FOR CARRYING OUT THE INVENTION

The present invention will now be described in more details.

The black resin composition of the present invention comprises (A) a light-shielding material, (B) an alkali-soluble resin, and (C) an organic solvent, and it is necessary to use at least (A-1) a carbon black surface-treated with a sulfur-containing compound and (A-2) titanium nitride compound particles as the light-shielding material (A). The desired properties of the black resin composition will be described below.

The black resin composition of the present invention can be used to produce printing ink, ink jet ink, material for photomask production, material for proof printing production, etching resist, solder resist, bulkheads of plasma display panel (PDP), derivative pattern, electrode (conductor circuit) pattern, circuit pattern of electronic component, conductive paste, conductive film, light-shielding image such as black matrix, and the like. Preferably, the black resin composition can be advantageously employed to set a light-shielding image (including black matrix), e.g., in a gap of a coloring pattern, vicinity portions, and in the side of the outside light of TFT to improve the display property of a color filter for a color liquid crystal display and the like, and can be advantageously employed for a light-shielding film for a touch panel.

Especially preferably, the black resin composition is used in liquid crystal displays, plasma displays, EL displays equipped with inorganic EL, CRT displays, and displays comprising a touch panel, as a black matrix such as black edges formed on the peripheral portion, lattice- or stripe-like black portions between color pixels of red, blue, and green, and, more preferably, dotted and linear black patterns for TFT light shielding.

In the black resin composition of the present invention, it is important to use at least the carbon black (A-1) surface-treated with a sulfur-containing compound as the light-shielding material (A), and in the surface composition of the carbon black, it is necessary that the percentage of carbon atoms be 95% or less, and the percentage of sulfur atoms 0.5% or more. Preferably, in the surface composition of the carbon black, the percentage of carbon atoms is 80% to 95%, and more preferably 80% to 90%. Preferably, in the surface composition of the carbon black, the percentage of sulfur atoms is 0.5% to 5.0%, and more preferably 1.0% to 5.0%. In addition, it is important to use the titanium nitride compound particles (A-2) as the light-shielding material (A); the titanium nitride compound contains titanium nitride as a major component, and generally contains titanium oxide $TiO_2$, low-valent titanium oxide represented by $Ti_nO_{2n-1}$ ($1 \leq n \leq 20$), and titanium nitride oxide represented by $TiN_xO_y$ ($0<x<2.0$, $0.1<y<2.0$) as minor components.

To produce the effects of the present invention, it is important to use a carbon black having insulation properties improved by surface treatment. Examples of commonly known treatments to improve insulation properties include surface coating with resin (Patent Document 2), wet surface-oxidation treatment (Patent Document 4), and surface modification with an organic group comprising a non-polymeric group (Patent Document 5). In the present invention, it is preferable to use a carbon black that is surface-modified with an organic group comprising a non-polymeric group, and through the use of such a carbon black, a resin black matrix that has high insulation properties even after high-temperature heat treatment can be obtained. In particular, it is preferable to use a carbon black that is surface-modified with an organic group having a sulfonic acid group, because high insulation properties can be achieved and reduction in insulation properties due to high-temperature treatment can be prevented. As an organic group having a sulfonic acid group, aryl sulfonic acids and salts thereof are preferred, and specific examples thereof include phenyl sulfonic acid and salts thereof, naphthyl sulfonic acid and salts thereof, and biphenyl sulfonic acid and salts thereof, but are not limited thereto.

For the surface composition of the carbon black in the present invention, it is necessary that the percentage of carbon atoms be 95% or less, and the percentage of sulfur atoms 0.5% or more. Further, it is preferred that the percentage of carbon atoms be 95% or less, and the percentage of sulfur atoms 1.0% or more. It is more preferred that the percentage of carbon atoms be 90% or less, and the percentage of sulfur atoms 1.0% or more. The higher the percentage of sulfur atoms on the carbon black surface is, the more effectively a binder resin is adsorbed to the carbon black, and the resulting steric hindrance prevents contact between carbon blacks, leading to improved insulation properties of a resin black matrix.

The sulfur components present at the surface of the carbon black is present in the form of disulfide, carbon disulfide, and oxide, and to make the effects of the present invention prominent, the sulfur components are desirably present in the form of oxide. Specifically, it is desirably present in the form of SO and SOx (2≤x≤4). The state of S atoms on the carbon black surface can be determined by X-ray photoelectron spectroscopy (XPS), and their abundance ratio can be determined by classifying S2p peak components into components assigned to C—S and S—S and components assigned to SO and SOx (2≤x≤4).

In the sulfur components present at the surface of the carbon black in the present invention, the percentage of components derived from SO and SOx is preferably 70% or more, and more preferably 80% or more. The higher the percentage of components derived from SO and SOx in the sulfur components present at the surface is, the higher the insulation properties become, and, further, the less the reduction in insulation properties due to high-temperature treatment is, which is preferred. The mechanism why a large amount of components derived from SO and SOx provides higher insulation properties and thermal stability is not clear, but is presumably because the adsorption of a binder resin to the carbon black becomes stronger. A similar analysis of the surface state of a surface-oxidized carbon black that is conventionally used shows that the percentage of components derived from SO and SOx in sulfur components present at the surface is 70% or less, and it can be said that the surface state is completely different.

The specific surface area of the carbon black used in the present invention is not restricted, and the value measured by the BET method using nitrogen adsorption is preferably 10 m²/g to 600 m²/g, more preferably 20 m²/g to 200 m²/g, and still more preferably 20 m²/g to 100 m²/g. When the carbon black has a large specific surface area, i.e., a small primary particle size, the particles are easily aggregated, and, therefore, it is difficult to stabilize dispersion, which leads to deteriorated storage stability. When the carbon black has a small specific surface area, i.e., a large primary particle size, the light-shielding effect decreases, or carbon blacks come in contact with each other in a resin coating to reduce the insulation properties of the black resin coating, which is not preferred.

For the powder volume resistivity ρ of the carbon black used in the present invention, the volume resistivity under a pressure of 50 kgf/cm² is preferably 20 Ω·cm or more, and more preferably 50 Ω·cm or more. The higher the volume resistivity of the carbon black is, the higher the surface resistance is when used as a resin black matrix, which is preferred. The carbon black surface-coated with a resin is known to have a volume resistivity as high as 100 Ω·cm or more (JP 2001-207079 A). The powder volume resistivity of the carbon black can be determined in such a manner that electrodes are placed at both ends of a cylindrical sample cell filled with samples, and a load is applied to the electrodes to measure the resistance value between the electrodes.

The carbon black surface-treated with a sulfur-containing compound preferably used in the present invention is commercially available (see Examples below), and it is also preferable to use commercially available products.

The content of the carbon black (A-1) based on the total weight of the light-shielding material (A) is preferably about 20% by weight to 80% by weight, and more preferably about 45% by weight to 80% by weight.

To make the effects of the present invention prominent, the angle of diffraction 2θ of the peak derived from (200) plane of the titanium nitride compound used in the present invention, when CuKα radiation is used as an X-ray source, is preferably 42.5° to 43.2°, more preferably 42.5° to 42.8°, and still more preferably 42.5° to 42.7°. Through the use of titanium nitride compound particles having an angle of diffraction θ in these ranges as a light-shielding material, a high OD value can be achieved while keeping the concentration of the light-shielding material in the black resin composition low, and, in addition, a good resin black matrix of high definition and taper shape can be readily formed because the titanium nitride compound particles have high ultraviolet transmittance.

For the X-ray diffraction spectrum of titanium compounds when CuKα radiation is used as an X-ray source, as the peak with the strongest intensity, the peak derived from (200) plane of TiN is observed in the vicinity of 2θ=42.5°, and the peak derived from (200) plane of TiO is observed in the vicinity of 2θ=43.4°. Further, the peak derived from (200) plane of anatase-type TiO₂ is observed in the vicinity of 2θ=48.1°, and the peak derived from (200) plane of rutile-type TiO₂ is observed in the vicinity of 2θ=39.2°, though the peaks are not the ones with the strongest intensity. Thus, in titanium compounds with a crystal structure having nitrogen atoms and oxygen atoms, the peak with the strongest intensity is observed within the range where the angle of diffraction 2θ is 42.5° to 43.4°. As the content of oxygen atoms in the crystal state increases, the peak position shifts to the higher angle side compared to 42.5°. In titanium nitride oxide with insufficient nitridation-reduction obtained by nitriding titanium oxide, the peak with the strongest intensity is observed within the range where the angle of diffraction 2θ is 42.9° to 43.2° (JP 2006-209102 A). When titanium oxide TiO₂ is contained as a minor component, as the peak with the strongest intensity, the peak derived from anatase-type TiO₂ (101) is observed in the vicinity of 2θ=25.3°, and the peak derived from rutile-type TiO₂ (110) is observed in the vicinity of 2θ=27.4°. However, since TiO₂ is white and thus can cause the decrease in the light-shielding effect of a black matrix, it is preferred that TiO₂ be decreased to the extent that it is not observed as a peak.

The size of crystallites constituting the titanium nitride compound particles can be determined from the half bandwidth of X-ray diffraction peak according to the Scherrer's formula shown in the equations (1) and (2) below.

$$\text{Crystallite Size (nm)} = \frac{K\lambda}{\beta\cos\theta} \quad (1)$$

$$\beta = \sqrt{\beta_e^2 - \beta_o^2} \quad (2)$$

In the equations, $K=0.9$, $\lambda=0.15418$ nm, $\beta_e$: half bandwidth of the diffraction peak, $\beta_o$: corrected value of the half bandwidth (0.12°), wherein $\beta$, $\beta_e$, and $\beta_o$ are calculated in radians.

The crystallite size is preferably 10 nm or more, more preferably 10 nm to 50 nm, and still more preferably 10 to 30 nm. If titanium nitride compound particles having a crystallite size of less than 10 nm are used, problems arise in that the light-shielding effect of a black matrix decreases, and, further, the dispersibility deteriorates. If the crystallite size is more than 50 nm, problems arise in that the light-shielding effect decreases, and, further, the particles are likely to precipitate to deteriorate storage stability. However, when the crystallite size is small, the reflected hue nears achromatic color though the light-shielding effect decreases, and, therefore, a moderately small size is preferred in the present invention.

The specific surface area of the titanium nitride compound particles in the present invention can be determined by BET method; its value is preferably 5 m$^2$/g to 100 m$^2$/g, more preferably 10 m$^2$/g to 100 m$^2$/g, and still more preferably 30 m$^2$/g to 100 m$^2$/g. Based on the specific surface area determined by BET method when the particles are assumed to be completely spherical and have a uniform particle size, the particle size can be calculated by the equation (3) below.

$$\text{BET average particle size (nm)} = 6/(S \times d \times 1000) \quad (3)$$

S: specific surface area (m$^2$/g); d: density (g/cm$^3$); and d=5.24 (g/cm$^3$) in case of titanium nitride, d=4.3 (g/cm$^3$) in case of titanium nitride oxide.

When the titanium nitride compound particles have a small specific surface area, i.e., a large primary particle size, it is difficult to disperse the particles finely, and problems arise in that the particles precipitate during storage; the flatness decreases when used as a resin black matrix; and the adhesion to glass decreases. When the titanium nitride compound particles have a large specific surface area, i.e., a small primary particle size, the particles are easily aggregated when dispersed, and, consequently, problems arise in that the dispersion stability tends to be worse, and when used as a resin black matrix, a sufficient hiding power of light-shielding material may not be provided and the OD value decreases, which is not preferred.

A primary particle can be said to be an aggregate of a number of crystallites but is preferably constituted by uniform crystallites. In other words, the relationship between the crystallite size determined from the half bandwidth of X-ray diffraction peak and the particle size determined from the specific surface area preferably satisfies the expression (4) below.

$$\text{BET average particle size (nm)} < \text{crystallite size (nm)} \times 2 \quad (4)$$

The titanium nitride compound particles used in the present invention contain TiN as a major component, and generally contain some oxygen atoms resulting from, for example, contamination of oxygen during synthesis and oxidation of the particle surface, which is especially marked when the particle size is small. The less oxygen content is preferred because a higher OD value can be obtained, and, in particular, it is preferable not to contain TiO$_2$ as a minor component. However, the less the oxygen content is, the more reddish the reflected color becomes, and thus the particles preferably contain oxygen atoms moderately. The content of oxygen atoms is preferably 5% by weight to 20% by weight, and more preferably 8% by weight to 20% by weight.

The content of titanium atoms can be analyzed by ICP optical emission spectrometry. The content of nitrogen atoms can be analyzed by inert gas fusion-thermal conductivity method. The content of oxygen atoms can be analyzed by inert gas fusion-infrared absorption method.

For synthesizing a titanium nitride compound, a gas-phase reaction method is generally used. Examples of the method include electric furnace process and thermal plasma method, and the thermal plasma method is preferred because the method causes less contamination of impurities, allows synthesis of particles with a uniform size, and shows high productivity. Specifically, the primary particle of the titanium nitride compound synthesized by the thermal plasma method is formed of substantially uniform crystallites, and using the titanium nitride compound synthesized by the thermal plasma method allows formation of a black matrix having a lower dielectric constant, which is preferred.

Examples of methods for generating thermal plasma include DC (direct-current) arc-discharge, multiple-phase arc-discharge, high-frequency (RF) plasma, and hybrid plasma, among which the high frequency plasma which causes less impurity contamination from an electrode is more preferred. Specific examples of methods for producing titanium nitride compound particles by the thermal plasma method include, but are not limited to, reacting titanium tetrachloride with ammonium gas in a plasma flame (JP 02-22110A), synthesis by vaporizing titanium powders with high-frequency thermal plasma and nitriding with nitrogen introduced as a carrier gas in a cooling process (JP 61-11140 A), and passing ammonia gas through the peripheral portion of plasma (JP 63-85007 A). Any production method may be employed as long as it produces titanium nitride compound particles having desired properties. Various types of titanium nitride compound particles are commercially available, and a number of titanium nitride compound particles satisfying the angle of diffraction and the amount of oxygen atoms defined in the present invention, and, furthermore, the preferred particle size and specific surface area described above are also commercially available. Such commercially available products may be preferably used in the present invention.

The percentage of the titanium nitride compound (A-2) in the total weight of the light-shielding material (A) is preferably 20% by weight to 80% by weight, and more preferably not less than 30% by weight. More preferred is not more than 70% by weight, and still more preferred is not more than 55% by weight. When the percentage of the titanium nitride compound is small, the reflected hue has an achromatic color, but the insulation properties are reduced, which is not preferred. In particular, reduction in insulation properties due to high-temperature thermal history will be significant, and, further, the dielectric constant will be high, which it not preferred. The larger the percentage of the titanium nitride compound is, the higher the insulation properties and light-shielding effect are, but the more reddish the reflected hue is. Therefore, the percentage of the titanium nitride is preferably within the range described above.

In the present invention, to adjust the chromaticity of a black coated film, a part of the carbon black (A-1) and the titanium nitride compound (A-2) may be replaced with other pigments to the extent that the OD value is not decreased. Examples of pigments other than the carbon black and the titanium nitride compounds that can be used include black organic pigments, mixed-color organic pigments, and inorganic pigments. Examples of black organic pigments include perylene black and aniline black. Examples of mixed-color organic pigments include pseudo black pigments obtained by mixing at least two or more pigments selected from red, blue, green, violet, yellow, magenta, cyanogens, and the like. Examples of inorganic pigments include graphite; and particles, oxides, composite oxides, sulfides, and nitrides of metals such as titanium, copper, iron, manganese, cobalt, chromium, nickel, zinc, calcium, and silver. These may be used alone or in combination of two or more thereof. When a part of the carbon black (A-1) and the titanium nitride compound (A-2) is replaced with other pigments, the content of the other pigments is usually not more than 20% by weight, and preferably not more than 10% by weight, based on the total weight of the light-shielding material.

In the present invention, the alkali-soluble resin (B) is an essential component, and any resin may be used as long as it acts as a binder to pigments and is soluble in alkaline developer in a developing process when forming a pattern such as a black matrix. Both photosensitive resins and non-photosensitive resins may be used, and, specifically, epoxy resins, acrylic resins, siloxane polymer-based resins, polyimide resins, and the like are preferably used. In particular, acrylic resins or polyimide resins are suitably used because they are excellent, for example, in heat resistance of a coating and storage stability of the black resin composition. Further, photosensitive alkali-soluble resins are suitably used because, in forming a pattern such as a black matrix, using a photosensitive resin facilitates the pattern-forming process.

Examples of photosensitive alkali-soluble resins are shown below, but are not limited thereto.

The photosensitive alkali-soluble resin is composed at least of an alkali-soluble polymer, a reactive monomer, and a photopolymerization initiator. For the quantitative ratio of them, the weight ratio of the alkali-soluble polymer to the reactive monomer is generally 10/90 to 90/10, and the amount of the photopolymerization initiator is about 1 to 20% by weight based on the total weight the polymer and the monomer.

As the alkali-soluble polymer, an alkali-soluble polymer having a carboxyl group is preferred, and unsaturated carboxylic acid can preferably be used. Examples of unsaturated carboxylic acids include monocarboxylic acids such as acrylic acid, methacrylic acid, crotonic acid, and vinyl acetic acid; dicarboxylic acids such as itaconic acid, maleic acid, and fumaric acid, or acid anhydrides thereof; and polycarboxylic acid monoesters such as phthalic acid mono(2-(meth)acryloyloxyethyl) ester. In particular, an acrylic polymer comprising a constituent unit derived from (meth)acrylic acid is preferred, and, further, an acrylic polymer obtained by reacting carboxylic acid contained in constituent units with a compound comprising an ethylenically unsaturated group and an epoxy group can preferably be used because it improves the sensitivity in exposure and developing. As the ethylenically unsaturated group, acrylic group and methacrylic group are preferred.

These may be used alone or in combination with another copolymerizable ethylenically unsaturated compound. Specific examples of copolymerizable ethylenically unsaturated compounds include, but are not limited to, unsaturated carboxylic acid alkyl esters such as methyl acrylate, methyl methacrylate, ethyl acrylate, ethyl methacrylate, n-propyl acrylate, isopropyl acrylate, n-propyl methacrylate, isopropyl methacrylate, n-butyl acrylate, n-butyl methacrylate, sec-butyl acrylate, sec-butyl methacrylate, iso-butyl acrylate, iso-butyl methacrylate, tert-butyl acrylate, tort-butyl methacrylate, n-pentyl acrylate, n-pentyl methacrylate, 2-hydroxyethyl acrylate, 2-hydroxyethyl methacrylate, benzyl acrylate, and benzyl methacrylate; aromatic vinyl compounds such as styrene, p-methylstyrene, o-methylstyrene, m-methylstyrene, and α-methylstyrene; (cross-linked) cyclic hydrocarbon groups such as tricyclodecanyl(meth)acrylate; unsaturated carboxylic acid aminoalkyl esters such as aminoethyl acrylate; unsaturated carboxylic acid glycidyl esters such as glycidyl acrylate and glycidyl methacrylate; carboxylic acid vinyl esters such as vinyl acetate and vinyl propionate; vinyl cyanide compounds such as acrylonitrile, methacrylonitrile, and α-chloroacrylonitrile; aliphatic conjugated dienes such as 1,3-butadiene and isoprene; and polystyrene, polymethyl acrylate, polymethylmethacrylate, polybutylacrylate, and polybutylmethacrylate, each having an acryloyl group or a methacryloyl group at its terminal. In particular, an acrylic polymer comprising (meth)acrylic acid and benzyl(meth)acrylate is particularly preferred in view of dispersion stability and ease of patterning.

When dispersing a pigment, adding the acrylic polymers described above in an amount of 5 to 50%, preferably 7 to 40%, based on the pigment provides a pigment dispersion in which the pigment is dispersed in a highly stable manner.

Further, in addition to the above-described acrylic polymer obtained by reacting (meth)acrylic acid contained in constituent units with a compound comprising an ethylenically unsaturated group and an epoxy group, an acrylic polymer having an ethylenically unsaturated group in the side chain can preferably be used. Specific examples thereof include a copolymer described in Japanese Patent No. 3120476 and JP 08-262221 A, i.e., an acrylic copolymer obtained by addition reaction of the carboxyl and hydroxyl side chains in an acrylic copolymer comprising styrene, unsaturated carboxylic acid, and an ethylenically unsaturated compound as copolymer components with an acryloyl- or methacryloyl-containing compound having a glycidyl group or acrylic acid chloride, a photo-curing resin "Cyclomer (registered trademark) P" (Daicel Chemical Industries, Ltd.) which is a commercially available acrylic polymer, and an alkali-soluble cardo resin.

The alkali-soluble polymer preferably has an average molecular weight (Mw) of 5,000 to 40,000 (measured by gel permeation chromatography using tetrahydrofuran as a carrier and calculated using a calibration curve of a standard polystyrene), and, further, a polymer having an average molecular weight of 8,000 to 40,000 and an acid value of 60 to 150 (mgKOH/g) is most preferred in view of photosensitive properties, solubility in ester solvents, solubility in alkaline developers, and prevention of residues.

The reactive monomer may be a multifunctional/monofunctional acrylic monomer or oligomer. Examples of multifunctional monomers include bisphenol A diglycidyl ether (meth)acrylate, poly(meth)acrylatecarbamate, denatured bisphenol A epoxy(meth)acrylate, adipic acid 1,6-hexanediol (meth)acrylic ester, phthalic anhydride propylene oxide (meth)acrylic ester, trimellitic acid diethylene glycol(meth)acrylic ester, rosin-modified epoxydi(meth)acrylate, alkyd-modified (meth)acrylate, fluorene diacrylate-based oligomers described in Japanese Patent No. 3621533 or JP 08-278630 A, tripropylene glycol di(meth)acrylate, 1,6-hexane diol di(meth)acrylate, bisphenol A diglycidyl ether di(meth)acrylate, trimethylolpropane tri(meth)acrylate, pentaerythritol tri(meth)acrylate, triacrylformal, pentaerythritol tetra(meth)acrylate and acid modifications thereof, dipentaerythritol hexa(meth)acrylate and acid modifications thereof, dipentaerythritol penta(meth)acrylate and acid modifications thereof, 2,2-bis[4-(3-acryloxy-2-hydroxypropoxy)phenyl]propane, bis[4-(3-acryloxy-2-hydroxypropoxy)phenyl]methane, bis[4-(3-acryloxy-2-hydroxypropoxy)phenyl]sulfone, bis[4-(3-acryloxy-2-hydroxypropoxy)phenyl]ether, 4,4'-bis[4-(3-acryloxy-2-hydroxypropoxy)phenyl]cyclohexane, 9,9-bis[4-(3-acryloxy-2-hydroxypropoxy)phenyl]fluorene, 9,9-bis[3-methyl-4-(3-acryloxy-2-hydroxypropoxy)phenyl]fluorene, 9,9-bis[3-chloro-4-(3-acryloxy-2-hydroxypropoxy)phenyl]fluorene, bisphenoxyethanol fluorene diacrylate, bisphenoxyethanol fluorene dimethacrylate, biscresol fluorene diacrylate, and biscresol fluorene dimethacrylate. These may be used alone or in combination.

Selection and combination of these polyfunctional monomers and oligomers enables control of resist sensitivity and workability. In particular, to increase the sensitivity, use of a compound having three or more functional groups, more preferably five or more functional groups, is preferred, and, in particular, dipentaerythritol hexa(meth)acrylate, dipentaerythritol penta(meth)acrylate, and acid modifications thereof are preferred. Further, unsaturated group-containing alkali-soluble monomers obtained by reacting a reactant of an epoxy compound having two glycidyl ether groups and methacrylic acid with polybasic carboxylic acid or acid anhydride thereof are also preferably used in view of developability and workability. Further, combined use with a (meth)acrylate containing a large number of aromatic rings and having a highly water-repellent fluorene ring in its molecule is preferred because a pattern can be controlled to a desired shape in development.

The photopolymerization initiator is not restricted, and it preferably contains an alkylphenone photopolymerization initiator and/or an oxime ester photopolymerization initiator.

Examples of alkylphenone photopolymerization initiators include α-aminoalkylphenone photopolymerization initiators and α-hydroxyalkylphenone photopolymerization initiators, and the α-aminoalkylphenone photopolymerization initiators are particularly preferred in view of high sensitivity. Examples thereof include 2,2-diethoxyacetophenone, 2-methyl-1-(4-methylthio phenyl)-2-morpholinopropan-1-one, 2-benzyl-2-dimethylamino-1-(4-morpholinophenyl)-butanone ("Irgacure (registered trademark)" 369, BASF), 2-(dimethylamino)-2-[(4-methylphenyl)methyl]-1-[4-(4-morpholinyl)phenyl]-1-butanone ("Irgacure (registered trademark)" 379, BASF), 1-hydroxycyclohexyl phenyl ketone, and 2-hydroxy-2-methyl-1-phenyl propan-1-one.

Specific examples of oxime ester photopolymerization initiators include 1,2-octanedione, 1-[4-(phenylthio)-2-(O-benzoyloxime)] ("Irgacure (registered trademark)" OXE01, BASF), ethanone, 1-[9-ethyl-6-(2-methylbenzoyl)-9H-carbazol-3-yl]-, 1-(O-acetyloxime) ("Irgacure (registered trademark)" OXE02, BASF), and "ADEKA (registered trademark) OPTOMER" N-1818, N-1919, and "ADEKA ARKLS" NCI-831 available from Asahi Denka Kogyo K.K.

In addition to these photopolymerization initiators, known photopolymerization initiators, e.g., inorganic photopolymerization initiators such as benzophenone compounds, thioxanthone compounds, imidazole compounds, benzothiazole compounds, benzooxazole compounds, carbazole compounds, triazine compounds, phosphorus compounds, or titanates can be used in combination. Examples thereof include benzophenone, N,N'-tetraethyl-4,4'-diaminobenzophenone, 4-methoxy-4'-dimethylaminobenzophenone, benzoin, benzoin methyl ether, benzoin isobutyl ether, benzyldimethylketal, α-hydroxyisobutylphenone, thioxanthone, 2-chlorothioxanthone, t-butylanthraquinone, 1-chloroanthraquinone, 2,3-dichloroanthraquinone, 3-choloro-2-methylanthraquinone, 2-ethylanthraquinone, 1,4-naphthoquinone, 9,10-phenanthraquinone, 1,2-benzoanthraquinone, 1,4-dimethylanthraquinone, 2-phenylanthraquinone, 2-(o-chlorophenyl)-4,5-diphenylimidazole dimer, 2-mercapto benzothiazole, 2-mercaptobenzooxazole, and 4-(p-methoxyphenyl)-2,6-di-(trichloromethyl)-s-triazine.

The organic solvent (C) used for the black resin composition of the present invention is not restricted, and esters, aliphatic alcohols, ketones, and the like can be used.

Specific examples of esters include, but are not limited to, benzyl acetate (boiling point: 214° C.), ethyl benzoate (boiling point: 213° C.), γ-butyrolactone (boiling point: 204° C.), methyl benzoate (boiling point: 200° C.), diethyl malonate (boiling point: 199° C.), 2-ethylhexyl acetate (boiling point: 199° C.), 2-butoxyethyl acetate (boiling point: 192° C.), 3-methoxy-3-methyl-butyl acetate (boiling point: 188° C.), diethyl oxalate (boiling point: 185° C.), ethyl acetoacetate (boiling point: 181° C.), cyclohexyl acetate (boiling point: 174° C.), 3-methoxy-butyl acetate (boiling point: 173° C.), methyl acetoacetate (boiling point: 172° C.), ethyl-3-ethoxy propionate (boiling point: 170° C.), 2-ethyl butyl acetate (boiling point: 162° C.), isopentyl propionate (boiling point: 160° C.), propylene glycol monomethyl ether propionate (boiling point: 160° C.), propylene glycol monoethyl ether acetate (boiling point: 158° C.), pentyl acetate (boiling point: 150° C.), and propylene glycol monomethyl ether acetate (boiling point: 146° C.).

Among these solvents, acetic acid ester solvents or propionic acid ester solvents such as 3-methoxy-3-methyl-butyl acetate, propylene glycol monoethyl ether acetate, propylene glycol monomethyl ether propionate, 3-methoxy-butyl acetate, and propylene glycol monomethyl ether acetate are particularly preferred.

Further, solvents other than the solvents described above, e.g., aliphatic ethers such as propylene glycol derivatives such as propylene glycol monomethyl ether (boiling point: 120° C.), propylene glycol monoethyl ether (boiling point: 133° C.), propylene glycol tertiary butyl ether (boiling point: 153° C.), and dipropylene glycol monomethyl ether (boiling point: 188° C.); aliphatic esters other than the above such as ethyl acetate (boiling point: 77° C.), butyl acetate (boiling point: 126° C.), and isopentyl acetate (boiling point: 142° C.); aliphatic alcohols such as butanol (boiling point: 118° C.), 3-methyl-2-butanol (boiling point: 112° C.), and 3-methyl-3-methoxybutanol (boiling point: 174° C.); ketones such as cyclopentanone and cyclohexanone; solvents such as xylene (boiling point: 144° C.), ethyl benzene (boiling point: 136° C.), and solvent naphtha (petroleum fraction, boiling point: 165 to 178° C.) can also be used in combination.

Further, as the size of substrates increases, coating with a die coating apparatus is becoming predominant, so that the solvent is preferably a mixed solvent comprising two or more components in order to achieve an appropriate volatility and drying properties. In cases where the boiling points of all the solvents constituting the mixed solvent are not higher than 150° C., many problems arise in that uniformity of film thickness cannot be attained; the film thickness after coating increases; and pigments aggregate at a nozzle part from where the coating solution is ejected through a slit, so that streaking occurs in the coated film. In cases where the mixed solvent contains many solvents having a boiling point not lower than 200° C., the coated film surface becomes adhesive, and sticking occurs. Hence, a mixed solvent containing 30 to 75% by mass of a solvent having a boiling point of 150° C. to 200° C. is preferred.

As an adhesion promoter that can be used for the black resin composition of the present invention, silane coupling agents can be contained. As the silane coupling agent, 3-glycidoxypropyltrimethoxysilane, 3-glycidoxypropyltriethoxysilane, 3-glycidoxypropylmethyldimethoxysilane, 3-glycidoxypropylmethyldiethoxysilane, vinyltrimethoxysilane, vinyltriethoxysilane, and the like are preferred in teens of raw material availability. The above compounds used in the present invention exhibit an adhesion-improving effect even when used in small amounts. Therefore, addition in large amounts is not necessary, and their amount is preferably 0.2 to 20% by mass, and more preferably 0.5 to 5% by mass, based on the total solids of a color resist.

In the black resin composition of the present invention, to disperse the light-shielding material uniformly and stably in a resin solution, it is preferable to add a pigment dispersant. Examples of pigment dispersants include polyester-based polymeric pigment dispersants, acrylic-based polymeric pigment dispersants, polyurethane-based polymeric pigment dispersants, polyallylamine-based polymeric dispersants, pigment derivatives, cationic surfactants, nonionic surfactants, anionic surfactants, and carbodiimide-based pigment dispersants.

There are various polymeric dispersants: dispersants having only an amine value, dispersants having only an acid value, dispersants having an amine value and an acid value, and dispersants having neither an amine value nor an acid value. To make the effects of the present invention prominent, it is preferable to use a dispersant having an amine value, and it is more preferable to use a dispersant having only an amine value. Through the use of a dispersant having an amine value, the carbon black of the present invention which is surface-modified with a sulfonic acid group can be finely dispersed in a more stable manner, and a coated film having high insulation properties can be formed.

Specific examples of polymeric dispersants having only an amine value include DISPERBYK 102, DISPERBYK 160, DISPERBYK 161, DISPERBYK 162, DISPERBYK 2163, DISPERBYK 2164, DISPERBYK 166, DISPERBYK 167, DISPERBYK 168, DISPERBYK 2000, DISPERBYK 2050, DISPERBYK 2150, DISPERBYK 2155, DISPERBYK LPN6919, DISPERBYK LPN21116, DISPERBYK LPN21234, DISPERBYK 9075, and DISPERBYK 9077 (available from BYK-Chemie); EFKA 4015, EFKA 4020, EFKA 4046, EFKA 4047, EFKA 4050, EFKA 4055, EFKA 4060, EFKA 4080, EFKA 4300, EFKA 4330, EFKA 4340, EFKA 4400, EFKA 4401, EFKA 4402, EFKA 4403, and EFKA 4800 (available from BASF); and AJISPER PB711 (available from Ajinomoto Fine-Techno Co., Inc.), but are not limited thereto. Among the polymeric dispersants having only an amine value, it is particularly preferable to use a polymeric dispersant having at least a tertiary amino group, and specific examples thereof include DISPERBYK LPN6919 and DISPERBYK LPN21116.

Specific examples polymeric dispersants having an amine value and an acid value include DISPERBYK 142, DISPERBYK 145, DISPERBYK 2001, DISPERBYK 2010, DISPERBYK 2020, DISPERBYK 2025, DISPERBYK 9076, and Anti-Terra-205 (available from BYK-Chemie); Solsperse 24000 (available from Lubrizol Corporation); and AJISPER PB821, AJISPER PB880, and AJISPER PB881 (available from Ajinomoto Fine-Techno Co., Inc.).

These pigment dispersants are appropriately selected depending on the type of pigment. Further, these pigment dispersants may be used alone or in combination of two or more thereof. Since these polymeric dispersants are not photosensitive, adding them in large amounts may deteriorate the photosensitivity of a color resist of interest, and it is desirable to add them in a proper amount taking into account dispersion stability and photosensitivity. Adding them in an amount of 1 to 50 (% by mass), more preferably 3 to 30 (% by mass), based on pigments produces the effect of achieving highly stabilized dispersion without deteriorating photosensitivity, which is more preferred.

To the black resin composition of the present invention, a surfactant can be added for the purpose of providing coating properties and smoothness of a colored coated film and preventing Benard Cells. The amount of the surfactant is generally 0.001 to 10% by mass, preferably 0.01 to 1% by mass, based on pigments. When the amount is too small, the effect of providing coating properties and smoothness of a colored coated film and preventing Benard Cells is not produced, and when the amount is too large, physical properties of a coated film can be poor. Specific examples of surfactants include anionic surfactants such as ammonium lauryl sulfate and polyoxyethylene alkyl ether sulfate triethanolamine; cationic surfactants such as stearylamine acetate and lauryl trimethyl ammonium chloride; amphoteric surfactants such as lauryldimethylamine oxide and lauryl carboxymethyl hydroxyethyl imidazolium betaine; nonionic surfactants such as polyoxyethylene lauryl ether, polyoxyethylene stearyl ether, and sorbitan monostearate; silicone-base surfactants having polydimethylsiloxane or the like as the main skeleton; and fluorochemical surfactants. These are not limiting examples, and in the present invention, the surfactants can be used alone or in combination of two or more thereof.

In the black composition of the present invention, the weight ratio of pigment component/resin component is preferably in the range of 80/20 to 40/60 in order to obtain a black coated film having a high OD value. The pigment component herein refers to the total of the light-shielding material (A) and color pigments for adjusting chromaticity, and the resin component refers to the total of the alkali-soluble resin (B) composed of polymers, monomers, and the like, oligomers, and additives such as photopolymerization initiators and polymeric dispersants. If the amount of the resin component is too small, the black coated film has poor adhesion to a substrate, and if the amount of the pigment component is too small, optical density per thickness (OD value/µm) decreases, both of which are problematic.

In the black resin composition of the present invention, the solids concentration, that is, the total of the resin component and the pigment component is preferably 2% to 30%, and more preferably 5% to 20%, in view of coating properties and drying properties. Accordingly, the black composition of the present invention preferably consists essentially of a solvent, a resin component, and a pigment component, wherein the total amount of the resin component and the light-shielding material is preferably 2% to 30%, and more preferably 5% to ore 20%, with the balance being the solvent. As described above, surfactants may be contained in the concentration described above.

The black resin composition of the present invention is produced by a method such as a method in which pigments are dispersed directly in a resin solution using a disperser, or a method in which pigments are dispersed in water or an organic solvent using a disperser to produce a pigment dispersion, which is then mixed with a resin solution. The method of dispersing pigments is not restricted, and various methods including those using a ball mill, a sand grinder, a triple roll mill, and a high-speed impact mill may be used. In view of dispersion efficiency and finely dispersing performance, using a bead mill is preferred. As the bead mill, a co-ball mill, a basket mill, a pin mill, a DYNO mill, and the like can be employed. As the beads for the bead mill, titania beads, zirconia beads, and zircon beads are preferably used. The diameter of the beads used for dispersion is preferably 0.01 mm to 5.0 mm, and more preferably 0.03 mm to 1.0 mm. In cases where the primary particle size of the pigments and the size of secondary particles formed by aggregation of the primary particles are small, fine dispersion beads of 0.03 mm to 0.10 mm are preferably used. In this case, it is preferred that dispersion be carried out by using a bead mill having a centrifugal separator capable of separating the fine dispersion beads from a dispersion. In cases where pigments containing larger submicron particles are dispersed, dispersion beads with a size of 0.10 mm or more are preferably used because sufficient grinding strength can be attained to disperse the pigments finely.

An example of the method of producing a resin black matrix substrate using the black resin composition of the present invention with a die coating apparatus will be described. Examples of substrates generally used include transparent substrates such as soda glass, alkali-free glass, and quartz glass, but are not limited thereto. Examples of the die coating apparatus include the sheet coating apparatus disclosed, for example, in Japanese Patent No. 3139358 and Japanese Patent No. 3139359. Using this apparatus, the black resin composition (coating solution) of the present invention is ejected from a nozzle, and a substrate is moved, whereby the black resin composition can be applied onto the substrate. In this case, since a large number of substrates are coated in sheet form, a long-time operation results in that pigments aggregate at the nozzle part from where the coating solution is ejected through a slit, which can be a coating defect to cause yield decrease.

In this case, the coating defect is solved to increase the yield by incorporating the step of wiping the nozzle, an ejection port of the apparatus, with a solvent containing the above-described ester solvent having a boiling point of 150° C. or higher in an amount of 40% by mass based on the total solvent. As described above, the black resin composition is applied onto a substrate, and then the solvent is removed, for example, by air-drying, vacuum drying, or heat drying to form a coated film of the black resin composition. In particular, by performing a vacuum drying step and additional heat drying with an oven or a hot plate, coating defects caused by convection are solved to increase the yield. The vacuum drying is preferably carried out at normal temperature to 100° C. for 5 seconds to 10 minutes at a reduced pressure of 500 to 10 (Pa), more preferably at a reduced pressure in the range of 150 to 50 (Pa). The heat drying is preferably carried out using an oven, a hot plate, or the like at a temperature in the range of 50 to 120° C. for 10 seconds to 30 minutes.

Next, a mask is placed on the coated film, and ultraviolet rays are irradiated using exposure equipment. Then, developing is performed using an alkaline developing solution. It is preferable to use an alkaline developing solution containing 0.1 to 5% of a surfactant such as a nonionic surfactant because a better pattern can be obtained. Examples of alkaline substances used in the alkaline developing solution include, but are not limited to, inorganic alkalis such as sodium hydroxide, potassium hydroxide, sodium carbonate, potassium carbonate, sodium silicate, sodium metasilicate, and aqueous ammonia; and organic alkalis such as primary amines such as ethylamine and n-propylamine; secondary amines such as diethylamine and di-n-propylamine; tertiary amines such as triethylamine and methyldiethylamine; tetraalkylammonium hydroxides such as tetramethylammonium hydroxide (TMAH); quarternary ammonium salts such as choline; alcohol amines such as triethanolamine, diethanolamine, monoethanolamine, dimethylaminoethanol, and diethylaminoethanol; and cyclic amines such as pyrrole, piperidine, 1,8-diazabicyclo[5,4,0]-7-undecene, 1,5-diazabicyclo[4,3,0]-5-nonane, and morpholine.

The concentration of the alkaline substance is 0.01% by mass to 50% by mass, preferably 0.02% by mass to 10% by mass, and more preferably 0.02 to 1% by mass. Further, when the developing solution is an aqueous alkaline solution, water-soluble organic solvents such as ethanol, γ-butyrolactone, dimethylformamide, and N-methyl-2-pyrrolidone may be appropriately added to the developing solution.

Among these developing solutions, an aqueous developing solution of an aqueous alkaline solution is preferred in view of work environment and waste developing solution disposal.

Any development method such as immersion method, spray method, or paddle method may be used. After the development, washing with pure water or the like is performed.

The resulting coating pattern of the black resin composition is then heat-treated (post-baked) for patterning. The heat treatment is generally carried out continuously or stepwise, for example, in air, in a nitrogen atmosphere, or in vacuum at a temperature of 150 to 300° C., preferably 180 to 250° C., for 0.25 to 5 hours.

The optical density (OD value) of the resin black matrix thus obtained from the black resin composition of the present invention is preferably 2.5 or more per 1.0 μm of film thickness within the visible wavelength range between 380 and 700 nm, more preferably 3.0 or more, and still more preferably 4.0 or more. The OD value is measured using a multi channel photo detector (MCPD2000 manufactured by OTSUKA ELECTRONICS CO., LTD.) and calculated by the equation (3) below $$\text{OD value} = \log_{10}(I_0/I) \qquad (3)$$

wherein, $I_0$ represents the intensity of incident light, and I represents the intensity of transmitted light.

The reflected light chromaticity of the resin black matrix is measured on the transparent substrate surface, and the chromaticity values (a*, b*) calculated by the CIE L*a*b* color system using the reflectance spectrum for standard illuminant C according to the method of JIS-Z8729 are preferably both −2.0 to 2.0, and more preferably −1.0 to 1.0. If the chromaticity values (a*, b*) are less than −2.0, a problem arises in that the image reflected in the film surface looks bluish and greenish when looking at the resin black matrix through the transparent substrate, and if they are more than 2.0, a problem arises in that the image reflected in the film surface looks reddish and yellowish.

The surface resistance value ρs (Ω/□) of the resin black matrix is preferably $10^{10}$ (Ω/□) or more, and more preferably $10^{12}$ (Ω/□) or more. The surface resistance value can be determined by making measurements by the method according to "JIS K 6911".

The relative dielectric constant ∈r at 1 MHz of the resin black matrix is preferably 10 or less, more preferably 8 or less, and still more preferably 6 or less. When the relative dielectric constant of the resin black matrix is more than 10, an ununiform electric field in a touch panel can be caused, leading to reduced sensitivity of a sensor electrode. The relative dielectric constant of the resin black matrix is preferably as small as possible. The lower limit thereof is not limited, but generally not less than 2 at 1 MHz.

EXAMPLES

The present invention will now be described in more detail using Examples and Comparative Examples, but the present invention is by no means limited to the following examples.
<Evaluation Method>
[Surface Elemental Composition]

The surface elements of the carbon black were measured by X-ray photoelectron spectroscopy (XPS) using a measuring device ESCALAB 220iXL (trade name) under the following measurement conditions: excitation X-ray; monochromatic AlKα1,2 radiation (1486.6 eV), X-ray diameter; 1 mm, and photoelectron take-off angle; 90°.
[X-Ray Diffraction]

X-ray diffraction was measured by filling a powdered sample in an aluminum standard sample holder by the wide-angle X-ray diffraction method (RU-200R manufactured by Rigaku Corporation). Measurements were made under the following conditions: X-ray source; CuKα radiation, output; 50 kV/200 mA, slit system; 1°-1°-0.15 mm-0.45 mm, measurement step (2θ); 0.02°, and scan rate; 2°/min. The angle of diffraction at the peak derived from (200) plane observed around 2θ=46° was measured. Further, from the half bandwidth of the peak derived from (200) plane, the size of crystallites constituting the particles was calculated using Scherrer's formula of the equations (1) and (2) described above.
[Composition Analysis]

The content of titanium atoms was measured by ICP optical emission spectrometry (ICP optical emission spectrometer SPS3000 manufactured by Seiko Instruments Inc.). The contents of oxygen atoms and nitrogen atoms were measured with Oxygen/Nitrogen analyzer EMGA-620W/C manufactured by HORIBA Ltd., and determined by inert gas fusion-infrared absorption method for oxygen atoms and by inert gas fusion-thermal conductivity method for nitrogen atoms.
[Specific Surface Area]

The specific surface area of the particles was measured using a high-performance automatic gas adsorption apparatus ("BELSORP" 36) manufactured by BEL Japan, Inc. After vacuum degassing at 100° C., the adsorption isotherm of $N_2$ gas at a temperature of liquid nitrogen (77 K) was measured and analyzed by BET method to determine the specific surface area. From the value of the specific surface area, a BET particle size was determined by using the equation (3) described above. In the calculation, the specific gravity: $d=5.24$ (g/cm$^3$) was used for the titanium nitride compound particles, and the specific gravity: $d=1.80$ (g/cm$^3$) was used for the carbon black.
[Powder Volume Resistivity]

Electrodes are placed at both ends of a cylindrical Teflon (registered trademark) sample cell filled with samples; a load is applied to the electrodes using AUTOGRAPH manufactured by Shimadzu Corporation; and the resistance value was measured using Low Resistance Meter 3540 manufactured by HIOKI E.E. CORPORATION. The volume resistivity ρ can be determined from the measured resistance value by the equation below, and the value measured at a pressure of 50 kgf/cm$^2$ was employed as the powder volume resistivity of the sample.

Powder volume resistivity $\rho[\Omega \cdot cm]=R \times S/t$ ($S$; sample cross-sectional area, $t$; sample thickness).

[OD Value]

A resin black matrix with a film thickness of 1.0 μm was formed on an alkali-free glass, and the OD value was determined using a multi channel photo detector (manufactured by OTSUKA ELECTRONICS CO., LTD., MCPD2000) by the equation (3) mentioned above.
[Reflected Light Chromaticity]

A resin black matrix with a film thickness of 1.0 μm was formed on a 0.7-mm-thick alkali-free glass, and the chromaticity of light reflected from the glass surface was measured using an UltraViolet-Vis-Near InfraRed spectrophotometer (Shimadzu spectrophotometer UV-2500PC) (measurement conditions: measured wavelength range; 300 to 780 nm, sampling pitch; 1.0 nm, scan rate; low, and slit width; 2.0 nm).
[Surface Resistance]

A resin black matrix with a film thickness of 1.0 μm was formed on an alkali-free glass, and the surface resistance (Ω/□) was measured using a high resistance meter (Hiresta UP manufactured by Mitsubishi Chemical Corporation). Also after the black matrix was heat-treated in an oven at 250° C. for 30 minutes, the surface resistance was measured in a similar manner.
[Relative Dielectric Constant]

A black matrix with a film thickness of 1.0 μm was formed on an ITO-deposited glass, and the relative dielectric constant (∈r) at a frequency of 1 MHz with no voltage applied was measured using an impedance analyzer (HP4192A manufactured by Agilent).

Synthesis of Acryl Polymer (P-1)

Methyl methacrylate/methacrylic acid/styrene copolymer (weight ratio: 30/40/30) was synthesized according to the method described in Example 1 of Japanese Patent No. 3120476, and then 40 parts by weight of glycidyl methacrylate was added thereto. The resulting mixture was redeposited with purified water, filtered, and dried to obtain an acryl polymer (P-1) powder having an average molecular weight (Mw) of 20,000 and an acid value of 110 (mgKOH/g). More specifically, after synthesizing the methyl methacrylate/methacrylic acid/styrene copolymer (weight ratio: 30/40/30), the addition of 40 parts by weight of glycidyl methacrylate was carried out as described below. To a 1000-cc four-necked flask, 100 g of isopropyl alcohol was charged. The flask was held in an oil bath at 80° C., and under a nitrogen seal and stirring, 30 g of methyl methacrylate, 40 g of styrene, 30 g of methacrylic acid, and 2 g of N,N-azobisisobutyronitrile mixed therewith were added dropwise thereto from a dropping funnel over 30 minutes. After the reaction was continued for 3 hours, 1 g of hydroquinone monomethyl ether was added, and then the temperature was brought back to normal temperature to complete the polymerization. The polymer thus obtained was taken as Polymer A. Next, 100 g of isopropyl alcohol was added to Polymer A, and while holding the resulting mixture at 75° C., 40 g of glycidyl methacrylate and 3 g of triethylbenzylammonium chloride were added and allowed to react for 3 hours.
Preparation of Carbon Black Dispersion (C-1)

The surface elemental composition, the ratio of components assigned to C—S and S—S to components assigned to SO and SOx among S2p peak components, the powder volume resistivity, and the BET value of a carbon black (CB-Bk1 available from Cabot Corporation, "TPX-1291") surface-treated with sulfonic acid groups are shown in Table 1.

The carbon black CB-Bk1 (200 g), a 40% by weight solution of the acryl polymer (P-1) in propylene glycol monomethyl ether acetate (94 g), a 20% by weight solution of DISPERBYK LPN21116 (polymeric dispersant) having a tertiary amino group and a quarternary ammonium salt as a pigment-adsorbing group (31 g), and propylene glycol monomethyl ether acetate (675 g) were charged into a tank, and stirred with a homomixer (manufactured by Tokusyu Kika Kogyo) for 1 hour to obtain a pre-dispersion. Thereafter, the pre-dispersion was supplied to Ultra Apex Mill (manufactured by KOTOBUKI INDUSTRIES CO., LTD.) equipped with a centrifugation separator 70% filled with zirconia beads with a diameter of 0.05 mm (available from Nikkato Corporation, YTZ balls), and dispersion was carried out at a rotation speed of 8 m/s for 2 hours to obtain a carbon black dispersion C-1 with a solids concentration of 25% by weight and pigment/resin (weight ratio)=80/20.
Preparation of Carbon Black Dispersion (C-2)

A carbon black (CB-Bk2) surface-treated with sulfonic acid groups was prepared according to the method described in Example 1 of Patent Document 5. More specifically, 550 g of Regal (registered trademark) 250R carbon black (available from Cabot Corporation), 31.5 g of sulfanyl acid, and 1000 g of deionized water were added into a plow mixer jacket-heated to 60° C. Into 100 g of deionized water, 12.6 g of sodium nitrite was dissolved to prepare a solution, and the solution was added to the mixture in the plow mixer. The reaction mixture was mixed at 60° C. for 2 hours at about 50 rpm and then allowed to cool to room temperature. The resulting carbon black-dispersed product was diluted to a solids concentration of 15% and treated by diafiltration at 7 times volume using deionized water. The final dispersed product was dried at 75° C. overnight and ground with an experimental blender to produce a powder of a phenyl sulfonic acid group-binding modified pigment.

The surface elemental composition, the ratio of components assigned to C—S and S—S to components assigned to SO and SOx among S2p peak components, the powder volume resistivity, and the BET value of CB-Bk2 are shown in Table 1. A carbon black dispersion C-2 was obtained in the same manner as in the case of the carbon black dispersion C-1 except that the carbon black CB-Bk2 was used.

Preparation of Carbon Black Dispersion (C-3)

A carbon black dispersion C-3 was obtained in the same manner as in the case of the carbon black dispersion C-1 except that DISPERBYK LPN6919 having a tertiary amino group as a pigment-adsorbing group was used as a polymeric dispersant.

Preparation of Carbon Black Dispersion (C-4)

A carbon black dispersion C-4 was obtained in the same manner as in the case of the carbon black dispersion C-1 except that DISPERBYK 2001 having a quarternary ammonium salt and a carboxyl group as a pigment-adsorbing group was used as a polymeric dispersant.

Preparation of Carbon Black Dispersion (C-5)

The surface elemental composition, the ratio of components assigned to C—S and S—S to components assigned to SO and SOx among S2p peak components, the powder volume resistivity, and the BET value of a surface-oxidized carbon black (CB-Bk3 available from Daido Chemical Corporation, "9930CF") are shown in Table 1. A carbon black dispersion C-5 was obtained in the same manner as in the case of the carbon black dispersion C-1 except that the carbon black CB-Bk3 was used.

Preparation of Carbon Black Dispersion (C-6)

The surface elemental composition, the ratio of components assigned to C—S and S—S to components assigned to SO and SOx among S2p peak components, the powder volume resistivity, and the BET value of a surface-oxidized carbon black (CB-Bk4 available from Columbia Carbon Inc., "RAVEN 1060Ultra") are shown in Table 1. A carbon black dispersion C-6 was obtained in the same manner as in the case of the carbon black dispersion C-1 except that the carbon black CB-Bk4 was used.

Preparation of Carbon Black Dispersion (C-7)

The surface elemental composition, the ratio of components assigned to C—S and S—S to components assigned to SO and SOx among S2p peak components, the powder volume resistivity, and the BET value a surface-untreated carbon black (CB-Bk5 available from Mitsubishi Chemical Corporation, "MA100") are shown in Table 1. A carbon black dispersion C-7 was obtained in the same manner as in the case of the carbon black dispersion C-1 except that the carbon black CB-Bk5 was used.

Preparation of Titanium Black Dispersion (T-1)

The angle of diffraction 2θ of the peak derived from (200) plane of titanium nitride compound particles (Ti-BK1 available from Nisshin Engineering Inc., TiN UFP Lot 13307215) produced by thermal plasma method was 42.62°. The crystallite size determined from the half bandwidth of this peak was 29.4 nm, and the BET specific surface area was 36.0 m$^2$/g. A composition analysis revealed that the titanium content was 72.2% by weight; the nitrogen content was 19.4% by weight; and the oxygen content was 6.37% by weight. X-ray diffraction peaks derived from TiO$_2$ were not observed at all.

The titanium nitride compound Ti-Bk1 (200 g), a 40% by weight solution of the acryl polymer (P-1) in propylene glycol monomethyl ether acetate (94 g), a 40% by weight solution of DISPERBYK LPN21116 (polymeric dispersant) having a tertiary amino group and a quarternary ammonium salt as a pigment-adsorbing group (31 g), and propylene glycol monomethyl ether acetate (675 g) were charged into a tank, and stirred with a homomixer (manufactured by Tokusyu Kika Kogyo) for 1 hour to obtain a pre-dispersion 1. Thereafter, the pre-dispersion 1 was supplied to Ultra Apex Mill (manufactured by KOTOBUKI INDUSTRIES CO., LTD.) equipped with a centrifugation separator 70% filled with zirconia beads with a diameter of 0.05 mm (available from Nikkato Corporation, YTZ balls), and dispersion was carried out at a rotation speed of 8 m/s for 2 hours to obtain a titanium black dispersion T-1 with a solids concentration of 25% by weight and pigment/resin (weight ratio)=80/20.

Preparation of Titanium Black Dispersion (T-2)

The angle of diffraction 2θ of the peak derived from (200) plane of titanium nitride compound particles (Ti-BK2 available from Nisshin Engineering Inc., TiN UFP Lot 1320910202) produced by thermal plasma method was 42.62°. The crystallite size determined from the half bandwidth of this peak was 21.9 nm, and the BET specific surface area was 85.0 m$^2$/g. A composition analysis revealed that the titanium content was 70.4% by weight; the nitrogen content was 19.9% by weight; and the oxygen content was 8.86% by weight. X-ray diffraction peaks derived from TiO$_2$ were not observed at all. A titanium black dispersion T-2 was obtained in the same manner as in the case of the titanium black dispersion T-1 except that the titanium nitride compound particles Ti-Bk2 were used.

Preparation of Titanium Black Dispersion (T-3)

A titanium black dispersion T-3 was obtained in the same manner as in the case of the titanium black dispersion T-1 except that DISPERBYK LPN6919 having a tertiary amino group as a pigment-adsorbing group was used as a polymeric dispersant.

Preparation of Titanium Black Dispersion (T-4)

A titanium black dispersion T-4 was obtained in the same manner as in the case of the titanium black dispersion T-1 except that DISPERBYK 2001 having a quarternary ammonium salt and a carboxyl group as a pigment-adsorbing group was used as a polymeric dispersant.

Example 1

The carbon black dispersion C-1 (274.2 g) and the titanium black dispersion T-1 (274.2 g) were mixed, and to the mixture, a 40% by weight solution of the acryl polymer (P-1) in propylene glycol monomethyl ether acetate (117.3 g), a 50% by weight solution (polyfunctional monomer) of dipentaerythritol hexaacrylate (DPHA available from Nippon Kayaku Co., Ltd.) in propylene glycol monomethyl ether acetate (92.7 g), "ADEKA ARKLS" NCI-831 (photopolymerization initiator) available from ADEKA CORPORATION (11.6 g), KBM503 (adhesion promoter) available from Shin-Etsu Chemical Co., Ltd. (7.5 g), and a solution obtained by dissolving a 10% by weight solution of propylene glycol monomethyl ether acetate, a silicone-base surfactant, (4.0 g) in propylene glycol monomethyl ether acetate (218.5 g) were added to obtain a black resin composition 1 with a total solids concentration of 25% by weight and pigment/resin (weight ratio)=46/54.

The black resin composition 1 was applied onto an alkali-free glass AN100 substrate using a spinner 1H-DS manufactured by MIKASA CO., LTD. and prebaked at 100° C. for 10 minutes to produce a coated film. Using a mask aligner PEM-6M manufactured by UNION OPTICAL CO., LTD., the coated film was exposed (200 mJ/cm$^2$) through a photomask, developed using a 0.045% by mass aqueous KOH solution, and then washed with pure water to obtain a patterning substrate. Further, the patterning substrate was cured at 230° C. for 30 minutes. In this manner, a black matrix 1 with a thickness of 1.00 µm was prepared.

Example 2

A black resin composition 2 was obtained in the same manner as in Example 1 except that the carbon black dispersion C-1 (137.1 g) was mixed with the titanium black dispersion T-1 (411.3 g). Further, a black matrix 2 with a thickness of 1.00 µm was prepared in the same manner as in Example 1 using the black resin composition 2.

Example 3

A black resin composition 3 was obtained in the same manner as in Example 1 except that the carbon black dispersion C-1 (411.3 g) was mixed with the titanium black dispersion T-1 (137.1 g). Further, a black matrix 3 with a thickness of 1.00 µm was prepared in the same manner as in Example 1 using the black resin composition 3.

Example 4

A black resin composition 4 was obtained in the same manner as in Example 1 except that the composition ratio in diluting a dispersion was changed to pigment/resin (weight ratio)=43/57. Further, a black matrix 4 with a thickness of 1.00 µm was prepared in the same manner as in Example 1 using the black resin composition 4.

Example 5

A black resin composition 5 was obtained in the same manner as in Example 1 except that the titanium black dispersion T-2 was used in place of the titanium black dispersion T-1. Further, a black matrix 5 with a thickness of 1.00 µm was prepared in the same manner as in Example 1 using the black resin composition 5.

Example 6

A black resin composition 6 was obtained in the same manner as in Example 1 except that the carbon black dispersion C-2 was used in place of the carbon black dispersion C-1. Further, a black matrix 6 with a thickness of 1.00 µm was prepared in the same manner as in Example 1 using the black resin composition 6.

Example 7

A black resin composition 7 was obtained in the same manner as in Example 1 except that the carbon black dispersion C-3 was used in place of the carbon black dispersion C-1, and the titanium black dispersion T-3 was used in place of the titanium black dispersion T-1. Further, a black matrix 7 with a thickness of 1.00 µm was prepared in the same manner as in Example 1 using the black resin composition 7.

Example 8

A black resin composition 8 was obtained in the same manner as in Example 1 except that the carbon black dispersion C-4 was used in place of the carbon black dispersion C-1, and the titanium black dispersion T-4 was used in place of the titanium black dispersion T-1. Further, a black matrix 8 with a thickness of 1.00 µm was prepared in the same manner as in Example 1 using the black resin composition 8.

Comparative Example 1

A black resin composition 9 was obtained in the same manner as in Example 1 except that the carbon black dispersion C-1 (548.4 g) was used as a pigment dispersion. Further, a black matrix 9 with a thickness of 1.00 µm was prepared in the same manner as in Example 1 using the black resin composition 9.

Comparative Example 2

A black resin composition 10 was obtained in the same manner as in Example 1 except that the carbon black dispersion C-5 (548.4 g) was used as a pigment dispersion. Further, a black matrix 10 with a thickness of 1.00 µm was prepared in the same manner as in Example 1 using the black resin composition 10.

Comparative Example 3

To 437.8 g of a carbon black dispersion C-8 (CF Black MP-108 available from MIKUNI COLOR LTD., solids concentration=30 wt %, pigment concentration=25 wt %) used as a pigment dispersion, the surface of the carbon black being resinified, a 40% by weight solution of the acryl polymer (P-1) in propylene glycol monomethyl ether acetate (126.0 g), a 50% by weight solution (polyfunctional monomer) of dipentaerythritol hexaacrylate (DPHA available from Nippon Kayaku Co., Ltd.) in propylene glycol monomethyl ether acetate (96.4 g), "ADEKA ARKLS" NCI-831 (photopolymerization initiator) available from ADEKA CORPORATION (12.1 g), KBM503 (adhesion promoter) available from Shin-Etsu Chemical Co., Ltd. (7.5 g), and a solution obtained by dissolving a 10% by weight solution of propylene glycol monomethyl ether acetate, a silicone-base surfactant, (4.0 g) in propylene glycol monomethyl ether acetate (316.3 g) were added to obtain a black resin composition 11 with a total solids concentration of 25% by weight and pigment/resin (weight ratio)=46/54. Further, a black matrix 11 with a thickness of 1.00 µm was prepared in the same manner as in Example 1 using the black resin composition 11.

Comparative Example 4

A black resin composition 12 was obtained in the same manner as in Example 1 except that the titanium black dispersion T-1 (548.4 g) was used as a pigment dispersion. Further, a black matrix 12 with a thickness of 1.00 µm was prepared in the same manner as in Example 1 using the black resin composition 12.

Comparative Example 5

A black resin composition 13 was obtained in the same manner as in Example 1 except that as a carbon black pigment dispersion, the carbon black dispersion C-5 was used in place of the carbon black dispersion C-1. Further, a black matrix 13 with a thickness of 1.00 µm was prepared in the same manner as in Example 1 using the black resin composition 13.

Comparative Example 6

A black resin composition 14 was obtained in the same manner as in Example 1 except that as a carbon black pigment dispersion, the carbon black dispersion C-6 was used in place of the carbon black dispersion C-1. Further, a black matrix 14 with a thickness of 1.00 μm was prepared in the same manner as in Example 1 using the black resin composition 14.

Comparative Example 7

A black resin composition 15 was obtained in the same manner as in Example 1 except that as a carbon black pigment dispersion, the carbon black dispersion C-7 was used in place of the carbon black dispersion C-1. Further, a black matrix 15 with a thickness of 1.00 μm was prepared in the same manner as in Example 1 using the black resin composition 15.

Comparative Example 8

A carbon black dispersion C-8 (219.1 g, CF Black MP-108 (trade name, available from MIKUNI COLOR LTD.)), the surface of the carbon black being resinified, and the titanium black dispersion T-1 (273.9 g) were mixed as a pigment dispersion, and to the mixture, a 40% by weight solution of the acryl polymer (P-1) in propylene glycol monomethyl ether acetate (121.7 g), a 50% by weight solution (polyfunctional monomer) of dipentaerythritol hexaacrylate (DPHA available from Nippon Kayaku Co., Ltd.) in propylene glycol monomethyl ether acetate (94.6 g), "ADEKA ARKLS" NCI-831 (photopolymerization initiator) available from ADEKA CORPORATION (11.8 g), KBM503 (adhesion promoter) available from Shin-Etsu Chemical Co., Ltd. (7.5 g), and a solution obtained by dissolving a 10% by weight solution of propylene glycol monomethyl ether acetate, a silicone-base surfactant, (4.0 g) in propylene glycol monomethyl ether acetate (267.5 g) were added to obtain a black resin composition 16 with a total solids concentration of 25% by weight and pigment/resin (weight ratio)=46/54. Further, a black matrix 16 with a thickness of 1.00 μm was prepared in the same manner as in Example 1 using the black resin composition 16.

The evaluation results are shown in Table 3. It can be seen that the black matrices formed using the resin compositions shown in Examples show high surface resistance, and what is more, they show high surface resistance even after heat treatment at 250° C. However, in cases where a carbon black is used alone as a light-shielding material, and in cases where a carbon black with a low percentage of sulfur atoms on the surface and a titanium nitride compound are used in combination, the reduction in surface resistance after heat treatment is significant. Furthermore, it can be seen that the black matrices formed using the resin compositions shown in Examples have reflected light chromaticity values (a*, b*) of −2.0 to 2.0, indicating that the image reflected in the film surface is achromatic, and further have a low dielectric constant.

TABLE 1

| | Surface Elemental Composition (atomic %) | | | | | S2p Peak Splitting | | Volume Resistance | | |
|---|---|---|---|---|---|---|---|---|---|---|
| | C | O | Na | S | N | SOx + SO | C—S, S—S | (Ω · cm) | BET | pH |
| Carbon Bk1 | 88.5 | 6.2 | 3.1 | 1.8 | 0.2 | 90 | 10 | 96.5 | 54 | 2.1 |
| Carbon Bk2 | 88.1 | 6.7 | 3.1 | 1.8 | 0.3 | 88 | 12 | 159.4 | 58 | 2.0 |
| Carbon Bk3 | 90.8 | 8.1 | 0.1 | 0.1 | 0.9 | 64 | 36 | 56.4 | 32 | 6.0 |
| Carbon Bk4 | 96.0 | 3.7 | — | 0.3 | — | 47 | 53 | 5.4 | 60 | 2.5 |
| Carbon Bk5 | 97.4 | 2.5 | — | 0.1 | — | 50 | 50 | 1.4 | 100 | 3.5 |

TABLE 2

| | Angle of Diffraction 2θ of Peak Derived from (200) Plane (°) | Half Bandwidth of Peak Derived from (200) Plane (°) | Crystallite Size (nm) | Specific Surface Area (m²/g) | BET Particle Size (nm) | Titanium Content (Weight %) | Nitrogen Content (Weight %) | Oxygen Content (Weight %) |
|---|---|---|---|---|---|---|---|---|
| Titanium Nitride 1 | 42.62 | 0.314 | 29.4 | 36.0 | 31.8 | 72.2% | 19.4% | 6.37% |
| Titanium Nitride 2 | 42.59 | 0.394 | 21.9 | 85.0 | 13.7 | 70.4% | 19.9% | 8.86% |

TABLE 3

| | Composition of Black Resin Composition | | | | | | Evaluation Results of Resin Black Matrix | | | | |
|---|---|---|---|---|---|---|---|---|---|---|---|
| | | | | | | | Surface Resistance (Ω/□) | | Reflected Light Chromaticity | | Dielectric Constant |
| | Pigment/Resin Mass | Carbon | Titanium Nitride | (A-1)/(A-2) Mass | Film Thickness | | 0 Minutes After 250° C. | 30 Minutes After 250° C. | | | |
| Standard | Ratio | Bk (A-1) | (A-2) | Ratio | (μm) | OD Value | Treatment | Treatment | a* | b* | 1 MHz |
| Example 1 | 46/54 | CB-Bk1 | Ti-Bk1 | 50/50 | 1.00 | 3.4 | >10¹⁵ | >10¹⁵ | 0.56 | 0.40 | 5.9 |
| Example 2 | 46/54 | CB-Bk1 | Ti-Bk1 | 25/75 | 1.00 | 3.6 | >10¹⁵ | >10¹⁵ | 1.49 | 1.04 | 5.7 |
| Example 3 | 46/54 | CB-Bk1 | Ti-Bk1 | 75/25 | 1.00 | 3.2 | 2 * 10¹⁴ | 3 * 10¹³ | 0.32 | 0.31 | 7.1 |
| Example 4 | 43/57 | CB-Bk1 | Ti-Bk1 | 75/25 | 1.00 | 3.0 | >10¹⁵ | >10¹⁵ | 0.32 | 0.20 | 6.6 |
| Example 5 | 46/54 | CB-Bk1 | Ti-Bk2 | 50/50 | 1.00 | 3.2 | >10¹⁵ | >10¹⁵ | 0.43 | 0.30 | 5.7 |
| Example 6 | 46/54 | CB-Bk2 | Ti-Bk1 | 75/25 | 1.00 | 3.2 | >10¹⁵ | >10¹⁵ | 0.30 | 0.31 | 6.1 |

TABLE 3-continued

| Standard | Pigment/Resin Mass Ratio | Carbon Bk (A-1) | Titanium Nitride (A-2) | (A-1)/(A-2) Mass Ratio | Film Thickness (μm) | OD Value | Surface Resistance ($\Omega/\square$) 0 Minutes After 250° C. Treatment | Surface Resistance ($\Omega/\square$) 30 Minutes After 250° C. Treatment | Reflected Light Chromaticity a* | Reflected Light Chromaticity b* | Dielectric Constant 1 MHz |
|---|---|---|---|---|---|---|---|---|---|---|---|
| Example 7 | 46/54 | CB-Bk1 | Ti-Bk1 | 75/25 | 1.00 | 3.2 | $1*10^{14}$ | $3*10^{13}$ | 0.35 | 0.32 | 7.2 |
| Example 8 | 46/54 | CB-Bk1 | Ti-Bk1 | 75/25 | 1.00 | 3.0 | $6*10^{13}$ | $1*10^{13}$ | 0.34 | 0.30 | 8.1 |
| Comp. Ex. 1 | 46/54 | CB-Bk1 | — | 0/100 | 1.00 | 3.1 | $3*10^{14}$ | $8*10^{12}$ | 0.14 | 0.33 | 9.9 |
| Comp. Ex. 2 | 46/54 | CB-Bk3 | — | 0/100 | 1.00 | 3.2 | $1*10^{11}$ | $5*10^{9}$ | 0.15 | 0.28 | 10.5 |
| Comp. Ex. 3 | 46/54 | CB-Bk6 | — | 0/100 | 1.00 | 3.0 | $5*10^{13}$ | $8*10^{10}$ | 0.10 | 0.30 | 9.3 |
| Comp. Ex. 4 | 46/54 | — | Ti-Bk1 | 100/0 | 1.00 | 3.0 | $>10^{15}$ | $>10^{15}$ | 2.10 | 1.76 | 5.5 |
| Comp. Ex. 5 | 46/54 | CB-Bk3 | Ti-Bk1 | 50/50 | 1.00 | 3.2 | $>10^{15}$ | $7*10^{12}$ | 0.50 | 0.35 | 6.2 |
| Comp. Ex. 6 | 46/54 | CB-Bk4 | Ti-Bk1 | 50/50 | 1.00 | 3.4 | $6*10^{11}$ | $4*10^{10}$ | 0.51 | 0.42 | 6.4 |
| Comp. Ex. 7 | 46/54 | CB-Bk5 | Ti-Bk1 | 50/50 | 1.00 | 3.2 | $4*10^{6}$ | $3*10^{6}$ | 0.52 | 0.38 | 7.0 |
| Comp. Ex. 8 | 46/54 | CB-Bk6 | Ti-Bk1 | 50/50 | 1.00 | 3.0 | $>10^{15}$ | $5*10^{12}$ | 0.58 | 0.44 | 5.9 |

Comp. Ex: Comparative Example

INDUSTRIAL APPLICABILITY

The black resin composition of the present invention can be used for a black matrix in a color filter substrate for liquid crystal displays.

The invention claimed is:

1. A black resin composition comprising (A) a light-shielding material, (B) an alkali-soluble resin, and (C) an organic solvent, the composition comprising (A-1) a carbon black and (A-2) titanium nitride compound particles as the light-shielding material (A), wherein the carbon black (A-1) is surface-treated with a sulfur-containing compound to include a surface having a surface composition, and in the surface composition, the percentage of carbon atoms is from 80% to 95% and the percentage of sulfur atoms is 0.5% or more.

2. The black resin composition according to claim 1, wherein in sulfur components in the surface composition of the carbon black (A-1), the percentage of components derived from SOx (wherein x is a number from 2 to 4) and/or SO is 70% or more.

3. The black resin composition according to claim 1, wherein when CuKα radiation is used as an X-ray source, the angle of diffraction 2θ of the peak derived from (200) plane of the titanium nitride compound particles (A-2) is 42.5° to 43.2°, and the crystallite size determined from the half bandwidth of the peak derived from (200) plane is 10 nm to 50 nm.

4. The black resin composition according to claim 1, wherein the titanium nitride compound particles (A-2) are produced by thermal plasma method.

5. The black resin composition according to claim 1, wherein the weight percentage of the titanium nitride compound particles (A-2) based on the total weight of the light-shielding material (A) is 20% by weight to 55% by weight.

6. The black resin composition according to claim 1, comprising a polymeric dispersant, wherein the polymeric dispersant has at least a tertiary amino group as a pigment-adsorbing group.

7. The black resin composition according to claim 1, wherein the black resin composition is configured for a touch panel.

8. A resin black matrix substrate comprising a resin black matrix formed from the black resin composition according to claim 1.

9. A touch panel comprising the resin black matrix substrate according to claim 8.

10. A method of forming a resin black matrix, comprising applying the black resin composition according to claim 1 onto a transparent substrate and forming a pattern.

11. A method of claim 10, wherein the in sulfur components in the surface composition of the carbon black (A-1), the percentage of components derived from SOx (wherein x is a number from 2 to 4) and/or SO is 70% or more.

12. The method of claim 10, wherein when CuKα radiation is used as an X-ray source, the angle of diffraction 2θ of the peak derived from (200) plane of the titanium nitride compound particles (A-2) is 42.5° to 43.2°, and the crystallite size determined from the half bandwidth of the peak derived from (200) plane is 10 nm to 50 nm.

13. The method of claim 10, wherein the titanium nitride compound particles (A-2) are produced by thermal plasma method.

14. The method of claim 10, wherein the weight percentage of the titanium nitride compound particles (A-2) based on the total weight of the light-shielding material (A) is 20% by weight to 55% by weight.

15. The method of claim 10, wherein the black resin composition comprises a polymeric dispersant, wherein the polymeric dispersant has at least a tertiary amino group as a pigment-adsorbing group.

16. The black resin composition according to claim 1, wherein the carbon black (A-1) improves an insulation property of a resin black matrix and suppresses a reduction in the insulation property of the resin black matrix due to thermal history of the resin black composition.

* * * * *